June 19, 1934.
J. PRACHAR
Re. 19,217
IRONING MACHINE
Original Filed Jan. 16, 1926 3 Sheets-Sheet 1
FIG.-1
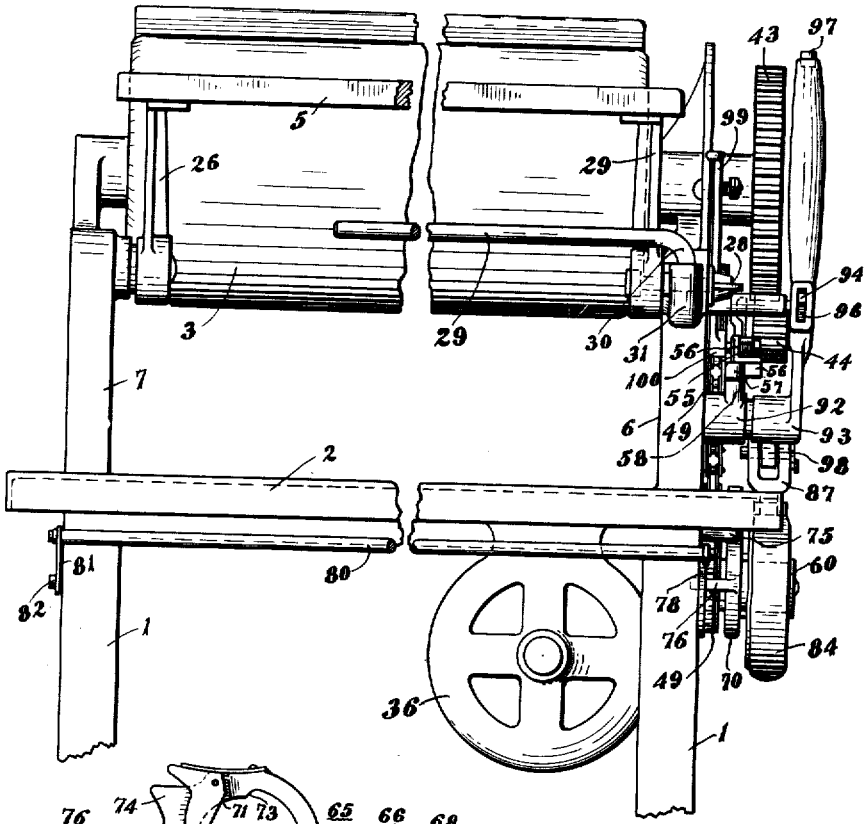
FIG.-6
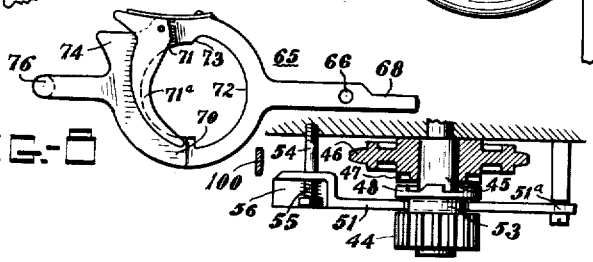
FIG.-7
*Inventor:*
JOHN PRACHAR, DECEASED
THE APEX ELECTRICAL MANUFACTURING COMPANY
ASSIGNEE.
BY Edmund J. De Pas
ATTORNEY June 19, 1934.

J. PRACHAR

Re. 19,217

IRONING MACHINE

Original Filed Jan. 16, 1926 3 Sheets-Sheet 2

Inventor:
JOHN PRACHAR, DECEASED.
THE APEX ELECTRICAL MANUFACTURING COMPANY
ASSIGNEE.

BY Edmund J. De Pas
ATTORNEY

June 19, 1934.
J. PRACHAR
Re. 19,217
IRONING MACHINE
Original Filed Jan. 16, 1926 3 Sheets-Sheet 3
FIG.-4
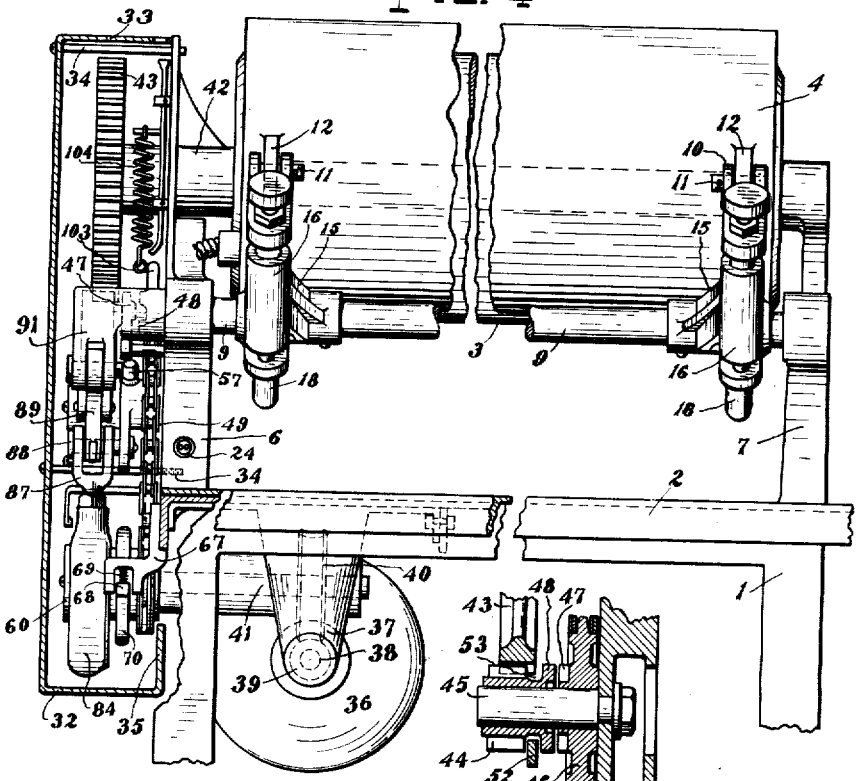
FIG.-5
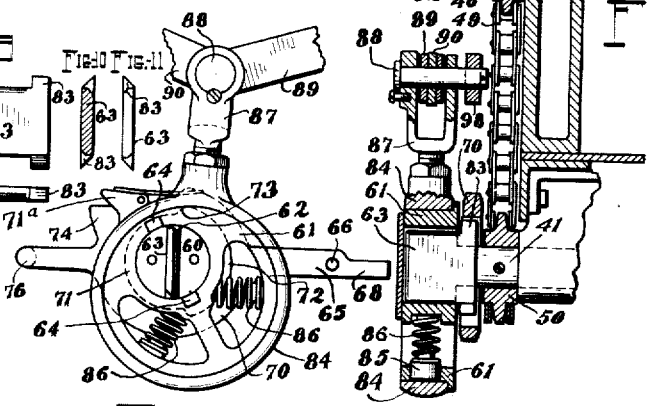
FIG.-3
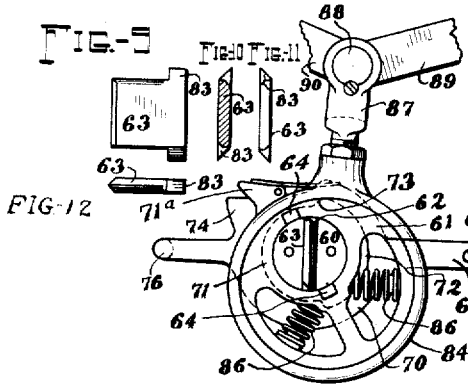
FIG.-10 FIG.-11
FIG.-12
FIG.-6
Inventor:
JOHN PRACHAR, DECEASED
THE APEX ELECTRICAL MANUFACTURING COMPANY
ASSIGNEE.
BY Edmund J. De Pas
ATTORNEY Reissued June 19, 1934

Re. 19,217

UNITED STATES PATENT OFFICE 19,217

IRONING MACHINE

John Prachar, deceased, late of Cleveland, Ohio, by The Apex Electrical Manufacturing Company, assignee, Cleveland, Ohio, a corporation of Ohio Original No. 1,753,964, dated April 8, 1930, Serial No. 81,614, January 16, 1926. Application for reissue January 8, 1934, Serial No. 705,835

24 Claims. (Cl. 68—9)

Figures 2, 3:
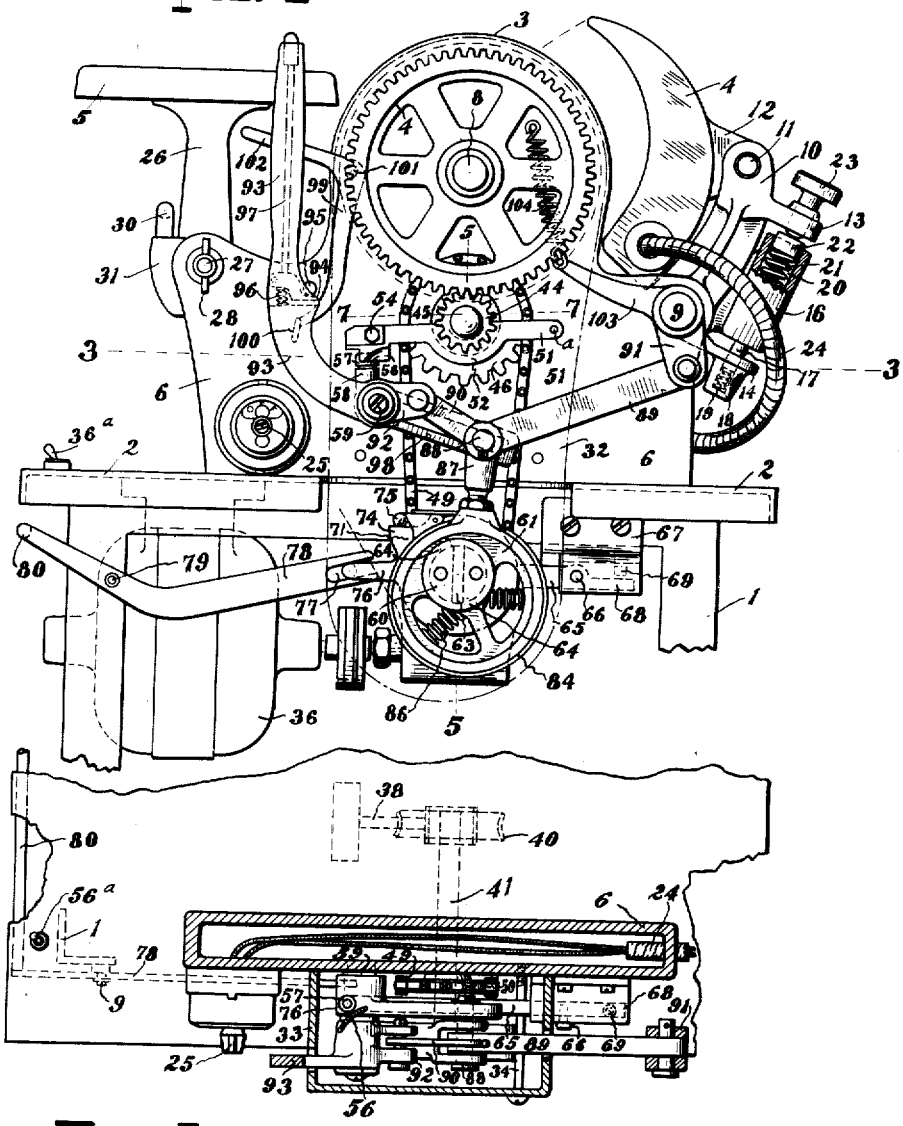

This invention relates to ironing machines and is an improvement over the ironing machines shown in his prior application Serial Nos. 686,943, filed January 18, 1924, which on April 8, 1930 matured into United States Letters Patent No. 1,753,939, and 23,198, filed April 15, 1925 which on January 15, 1929 matured into United States Letters Patent No. 1,699,310 and the present application constitutes a continuation-in-part of such earlier filed applications.

The present invention has for an object to provide simplified and improved means for actuating the ironing shoe and for controlling the operation of the ironing roll.

A further object is to provide means by which the ironing shoe may be instantly released and shifted away from the roll.

A further object is to provide, in connection with the power operated means for shifting the shoe, means whereby the drive for the ironing roll may be so controlled by the shoe shifting means as to rotate the roll when the shoe is moved into engagement therewith, or the roll driving means may be caused to remain inoperative while the shoe is being shifted.

With the above and other objects in view the invention may be said to comprise the machine as illustrated in the accompanying drawing hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a front elevation of the machine with the gear housing removed to show the operating mechanism; Fig. 2 is an end elevation of the machine; Fig. 3 is a section taken on line 3—3 of Fig. 2; Fig. 4 is a rear elevation of the machine with the gear housing broken away and shown in section; Fig. 5 is a sectional view taken on line 5—5 of Fig. 2; Fig. 6 is a detail view showing the toggle actuating eccentric and the clutch for connecting the eccentric to the shaft upon which it is mounted; Fig. 7 is a sectional view taken on line 7—7 of Fig. 2; Fig. 8 is a side elevation of the member for the clutch of the eccentric; Figs. 9 to 12, inclusive, are detail views of the clutch key showing the same in plan, in section, in end elevation and in side elevation.

As shown in the accompanying drawings the ironing mechanism is mounted upon a suitable table or stand which has supporting legs 1 and a top 2 which carries the ironing mechanism. The ironing instrumentalities comprise a rotatable roll 3 and an ironing shoe 4 which is heated by suitable means and has a concave face adapted to fit against the roll when the shoe is shifted to roll engaging position. A feed board 5 may also be provided, and this board, when in operative position, is positioned along the front and near the top of the roll so that the goods being ironed can be readily fed between the roll and the shoe. Suitable upright brackets 6 and 7 are mounted upon the top 2 at opposite ends thereof and the roll and shoe are supported between the brackets, the roll 3 being carried by a shaft 8 and the shoe 4 being carried by a rock shaft 9, both shafts being journaled at opposite ends in the brackets 6 and 7.

An important feature of the present invention is the mounting of the shoe upon the rock shaft in such manner that either end of the shoe may yield independently of the other to accommodate goods of varying thicknesses passing between the roll and shoe. The opposite ends of the shoe 4 are supported by arms 10 which are pivoted upon the rock shaft 9 at their lower ends and connected by pivot pins 11 at their upper ends with lugs 12 projecting from the rear side of the ironing shoe substantially midway between the upper and lower edges thereof, the pins 11 having a loose fit in the apertures of the lugs 12 through which they pass so that opposite ends of the shoe may move toward and from the roll independently. The arms 10 are provided adjacent the upper and lower ends thereof with rearwardly projecting lugs 13 and 14 through which the arms 10 are actuated by means of arms 15 which are fixed to the shaft 9 alongside the arms 10 and which have enlarged outer end portions 16 offset laterally and lying between the lugs 13 and 14 of the arms 10. Each of the portions 16 of the arms 15 is provided with a pin 17 at its lower end which fits in a socket 18 formed in the adjacent lower lug 14 and bears upon the upper end of a compression coil spring 19 within the socket 18. The enlarged portions 16 of the arms 15 are bored from their upper ends to provide sockets 20 in which compression coil springs 21 are mounted. At the upper end of each of the sockets 20 there is mounted a slidable plunger 22 which bears against the upper end of the spring 21, the plungers 22 engaging with the lower end of set screws 23 carried by the upper lugs 13. Movement of the rock shaft in one direction causes pressure to be exerted upon the arms 10 through the compression springs 19 carried by the lower lugs 14 of the arms, pressure in this direction acting to swing the arms outwardly away from the roll to carry the ironing shoe 4 out of contact with the roll. Movement of the rock shaft 9 in the opposite direction exerts upward pressure upon the lugs 13 of the arm through the compression spring 21 to swing the arms inwardly to move the ironing shoe into contact with the roll. Means are provided, as will be hereinafter explained, for rigidly holding the rock shaft 9 in the position in which the shoe 4 bears against the roll 3, and the yielding connection provided between the shoe supporting arms 10 and the actuating arms 15 permits one end of the shoe 4 to yield independently of the other so that uniform pressure will be exerted upon goods passing between the roll and shoe even though the material is thicker at one end of the roll than at the other. The tension of the compression springs 19 and 21 associated with each arm may be varied by adjusting the set screws 23 to vary the pressure with which the shoe is held against the roll.

The ironing shoe 4 is preferably provided with suitable electrical heating means and the electric current may be supplied to the elements within the shoe by means of wires which extend into the end of the shoe and through a suitable flexible conduit 24 and through the bottom portion of the bracket 6 to a suitable switch 25 on the outer side of the bracket 6 adjacent the forward end thereof. The current supplied through the switch 25 to the heating elements of the shoe may be supplied through a suitable extension cord (not shown) from the house lighting circuit.

The feed board 5 is supported at its opposite ends by suitable posts or arms 26 which have trunnions 27 journaled in the brackets 6 and 7 at the forward ends thereof, one of the trunnions 27 being provided with a wing nut 28 by means of which the feed board 5 may be locked in adjusted position. An adjustable hanger rod 29 may be provided for supporting articles to be ironed or which have been ironed, the rod 29 being supported for horizontal swinging movement on one of the supporting brackets. The inner end 30 of the rod 29 is bent at right angles and is rotatably supported in a vertical socket 31 formed in the bracket 6 immediately in front of the bearing 7 for the trunnion 27 of the adjacent post 26. The rod 29 may be swung from a position parallel with the roll and beneath the feed board 5 to a position in which it extends outwardly from the roll and the feed board.

The gearing for driving the roll 3 and the mechanism for shifting the ironing shoe 4 into and out of engagement with the roll is all mounted upon the outer side of the supporting bracket 6 and housed within a casing 32 which has an edge flange 33 which bears against the outer face of the bracket 6 and which is detachably secured to the bracket 6 by means of bolts 34. At the lower end of the casing 32 there is an upwardly extending flange 35 at the inner side of the casing which will retain any oil which drips from the mechanism within the casing.

The ironing mechanism is operated by an electric motor 36 which is supported beneath the top 2 of the supporting stand by means of a suitable hanger 37 and which may be controlled by a suitable switch 36ᵃ on the top 2 adjacent the front edge near an end thereof. The motor is so supported that its shaft 38 stands transversely of the supporting stand and in a direction at right angles to the axis of the roller. The motor shaft 38 carries a worm 39 which meshes with a worm gear 40 on a countershaft 41 which extends longitudinally of the supporting stand and projects at its outer end into the casing 32.

The roll shaft 8, which is driven from the shaft 41, projects through its bearing 42 in the bracket 6 and within the casing 32 has fixed thereto a large spur gear 43 which meshes with a small spur gear 44 which is slidably and rotatably mounted upon a stub shaft 45 journaled in the bracket 6 below the roll. The small spur gear 44 is at all times in mesh with the large gear 43, the gear 44 being of sufficient width to remain in mesh with the gear 43 as it is moved longitudinally of the shaft 45. Fixed to the shaft 45 to the inner side of the gear 44 is a sprocket 46 to which the gear 44 is locked when in its innermost position by means of clutch teeth 47 and 48 formed upon the outer side of the sprocket 46 and the inner side of the gear 44. The sprocket 46 is constantly driven during the operation of the motor by means of an endless sprocket chain 49 which passes over the sprocket 46 and over a sprocket 50 fixed to the shaft 41. The ironing roll 3 is driven whenever the gear 44 is clutched to the sprocket 46 and remains idle whenever the gear 44 is released from the sprocket. The movement of the gear 44 into and out of engagement with the sprocket 46 is effected by means of a lever 51 which is pivotally mounted at 51ᵃ upon the outer side of the bracket 6 and which is provided intermediate its ends with a downwardly bent portion 52 which extends beneath the shaft 45 and engages in a groove 53 formed between the toothed portion of the gear 44 and the clutch portion 48 thereof. The forward end of the lever 51 is slidable in and out on a horizontal bolt 54 which projects outwardly from the bracket 6 and is normally held in its innermost position by means of a coil spring 55 interposed between the head of the bolt 54 and the lever, the spring 55 acting to normally hold the gear 44 in engagement with the sprocket 46. The lever 51 is formed at its forward end to provide an inclined cam 56 with which a roll 57 carried by a pivoted arm 58 engages to force the lever 51 outwardly against the action of the spring 55 and to hold the gear 44 out of engagement with the sprocket 46. The arm 58 is pivoted on a pin 59 projecting outwardly from the bracket 6 beneath the lever 51 and is actuated by means which will be hereinafter described to move the roller 57 into and out of engagement with the cam 56 to disengage the gear 44 or to permit the gear 44 to be moved by the spring 55 into engagement with the sprocket 46.

Means is provided for utilizing the motor for shifting the shoe 4 into or out of roll engaging position, and for simultaneously actuating the arm 58 to cause the roll to be driven as the shoe 4 is moved into engagement with the roll, and to cause the roll to be stopped as the shoe 4 is moved out of engagement with the roll. The shoe shifting means is operated from the shaft 41 and to this end there is fixed to the outer end of the shaft 41 a clutch member 60 upon which there is rotatably mounted an eccentric 61. The clutch member 60 has a slot 62 extending diametrically therethrough, and, in this slot, there is slidably mounted a flat key plate 63, the width of which is substantially equal to the diameter of the clutch member in which it is mounted. This key plate is adapted to engage with either of two diametrically opposed notches 64 formed in the wall of the opening of the eccentric within which the member 60 rotates, the key plate 63 when engaged in a notch 64 serving to lock the eccentric to the clutch member for rotation therewith. Means is provided for shifting the key plate 63 into engagement with one of the notches 64 to cause the eccentric to turn with the shaft and for automatically disengaging the key plate from the eccentric after the eccentric has been turned through half of a revolution. The clutch controlling member is in the form of a lever 65 which is connected by a horizontal pivot 66 to a bracket 67 secured to the supporting frame rearwardly of the shaft 41. The lever 65 has an extension 68 projecting rearwardly from the pivot 66 and this extension is acted upon by a spring 69 interposed between the upper side of the extension 68 and a portion of the supporting bracket, the spring 69 pressing downwardly from the extension 68 serving to normally hold the lever 65 in its uppermost position. The lever 65 is provided with a cam ring portion 70 which encircles the clutch member 60 immediately to the inner side of the eccentric 61. The interior of the cam ring 70 has two half portions 71 and 72 formed on concentric circles of different diameters, the half portion 71 being of a diameter but slightly greater than that of the clutch member 60 and the other half portion 72 being of a somewhat larger diameter than the portion 71 and the portions 71 and 72 of the cam being connected at the top by an inclined portion 73. The cam ring 70 is provided with a projection 74 which engages with a stud 75 on the supporting frame to limit the upward movement of the lever 65, and the lever is normally held in its uppermost position with the lug 74 engaging the stud 75 by the spring 69. The cam ring 70 also has an extension 76 projecting forwardly therefrom and this extension is bent laterally at its outer end and extends into a slot 77 in the rear end of the lever 78 which is pivoted to the front supporting leg 1 at 79 and has attached to its free end a cross rod 80 which extends the full length of the frame immediately beneath the forward edge of the top 2, the oposite end of the rod 80 being supported by an arm 81 connected to the supporting leg at the opposite end of the stand by a pivot 82 which is co-axial with the pivot 79 of the lever 78. When the rod 80 is moved upwardly the rear end of the lever 78 is moved downwardly shifting the cam ring 70 downwardly from its normal position in which it is held by the spring 69. The rod 80 is so positioned that it can be conveniently shifted in an upward direction by the knee of the operator and the shifting of the rod 80 and lever 78 causes engagement of the key plate 63 with the eccentric 61 as will now be explained.

The key plate 63 projects beyond the inner side of the eccentric 61 and, upon the inner side of the eccentric, is provided with a widened portion 83 which turns within the cam ring 70. When the cam ring 70 is in its normal position with the lug 74 engaging the stud 75, the two semi-circular portions 71 and 72 of the cam ring are co-axial with the shaft 41 and clutch member 60. The width of the widened portion 83 of the key plate is substantially equal to the diameter of the smaller portion 71 of the cam ring, and when the cam ring is in normal position one edge of the widened portion 83 will always be in engagement with the smaller portion 71 of the cam ring, and the portion of the key plate 63 which lies within the eccentric 61 will be held entirely within the clutch member 60, permitting the clutch member 60 to rotate freely within the eccentric 61. Whenever downward pressure is exerted upon the cam ring by actuation of the lever 78 this downward pressure will tend to slide the key 63, in its slot 62, and when the slot 62 registers with the lowermost notch 64 in the eccentric, the key plate 63 will be forced into the notch, locking the eccentric to the clutch member so that the eccentric will turn therewith. The lever 78 is only momentarily actuated and then released, permitting the cam ring 70 to return to its normal position. The notch 64 of the eccentric with which the key plate 63 engages is positioned, when the eccentric is disconnected, adjacent the lower end of the enlarged portion 72 of the cam ring so that the cam ring is free to return to its normal position without disengaging the key plate from the eccentric. However, when the eccentric has made half of a revolution the projecting edge of the inner portion 83 of the key plate will come into engagement with the inclined portion 73 at the top of the cam ring and will be forced downwardly as the clutch member 60 carries the edge of the key plate from the enlarged portion 72 to the smaller portion 71 of the cam ring causing the key plate to be moved back into its normal position in which it is free from the eccentric 61, and as long as the cam ring remains in its normal position, the eccentric will remain disengaged from the clutch member. The inclined portion 73 of the cam ring being at the top thereof, acts to release the eccentric with the two diametrically opposite notches 64 of the eccentric substantially in their uppermost and lowermost positions so that when downward thrust is exerted on the cam ring the thrust acts directly upon the key plate 63 to force it into the lowermost notch. If the eccentric should be displaced a considerable angle from its normal position while disengaged from the clutch member, the cam ring 70 might be depressed without causing the key plate to enter into locking engagement with the notch of the eccentric. To eliminate this possibility a spring pressed wiper 71ᵃ is mounted on the cam ring 70 and extends alongside the portion 71 of the cam ring. The wiper 71ᵃ has its inner edge formed to correspond substantially to the curvature of the cam portion 71 of the ring and presses yieldingly against the edge of the key plate as it passes around the portion 71 of the cam ring. If the eccentric should be displaced from its normal position when the cam ring is actuated the spring pressed wiper will exert the necessary pressure on the key plate to force it into the notch 64.

The eccentric 61 has mounted thereon a sleeve 84 within which it turns to actuate the shoe shifting mechanism. To maintain a close frictional bearing between the eccentric 61 and its sleeve, the eccentric is provided with wear blocks 85 which are pressed radially outward against the interior of the sleeve 84 by means of coil springs 86. A connecting rod 87 is attached at its lower end to the sleeve 84 and at its upper end to the pivot 88 of a shoe shifting toggle which comprises a pair of links 89 and 90 which are pivotally connected by the pin 88. The link 89 extends rearwardly from the pin 88 and is connected to an arm 91 which is fixed to the rock shaft 9 which carries the ironing shoe. The other link 90 of the toggle extends forwardly from the pivot and is pivotally connected to an extension 92 of a hand lever 93 which is pivoted on the pin 59 upon which the clutch lever actuating arm 58 is pivotally mounted. The lever 93 is curved upwardly and at its free end is normally held in an upright position slightly in front of the roll upon the outside of the bracket 6 by means of a latch 94 which engages with a pin 95 projecting from the outer side of the bracket 6, the latch 94 being normally urged toward a retaining position by means of a coil spring 96. The latch 94 may be released by pressing down on a plunger 97 which is slidably mounted in the hand grip portion of the lever and projects beyond the upper end thereof. The lever 93 is normally retained by the latch 94 in the position shown in Fig. 2 of the drawing, and when the lever is held in this position the pivot between the extension 92 of the lever and the link 90 of the toggle is a fixed pivot receiving the thrust of the toggle so that the arm 91 will be moved to shift the ironing shoe when the eccentric is actuated. The movement of the eccentric 61 upon each actuation of its half revolution clutch is such as to cause the pivot 88 of the toggle to move from substantially its lowermost position to substantially its uppermost position, or vice versa, depending upon the position of the eccentric when the clutch is engaged. When the ironing shoe is disengaged, as shown in Fig. 2 of the drawings, the pivot 88 of the toggle is in its lowermost position and engagement of the eccentric clutch will cause the eccentric to make a half revolution raising the pivot 88 to its uppermost position straightening the toggle links 89 and 90 and moving the shoe into engagement with the roll. When the shoe is in engagement with the roll, the toggle formed by the links 89 and 90 is substantially straight, and by releasing the hand lever 93 and pulling the same forwardly, the arm 91 may be swung forwardly turning the rock shaft in the direction to swing the shoe 4 out of engagement with the roll, the eccentric sleeve 84 turning upon the eccentric to permit the necessary movement of the toggle pivot 88. The release of the lever 93 also renders the eccentric inoperative to shift the ironing shoe since the toggle cannot exert a thrust upon the arm 91 of the rock shaft when the lever 93 is free to move.

It is desirable that the ironing roll be automatically stopped whenever the ironing shoe is moved out of engagement therewith, and to accomplish this result means has been provided for actuating the arm 58 to shift the clutch lever 51 to disengage the roll from its driving means whenever the ironing shoe is moved out of engaging position whether by power or by hand. To this end the arm 58 is provided with a slotted extension 98 through the slot of which the pivot 88 of the toggle extends. Whenever the pivot 88 of the toggle is moved upwardly by the eccentric 61 or forwardly by the lever 93, the extension 98 is swung downwardly moving the arm 58 upwardly bringing the roller 57 into engagement with the cam 56, forcing the lever 51 outwardly and disengaging the gear 44 from the sprocket 46. Whenever the toggle pivot 88 is moved upwardly from the position shown in Fig. 2, by the eccentric 61 to shift the ironing shoe into engagement with the roll, the extension 98 is swung upwardly moving the roller 57 out of engagement with the cam permitting the gear 44 to be shifted into clutching engagement with the sprocket 46 by the spring 55 acting on the clutch lever 51 so that the roll will be started into operation as the shoe is moving into engagement therewith.

Means is also provided by which the shoe may be engaged with the roll without driving the roll so that the ironing machine may be used for pressing operations in which the article to be pressed is held between the heated ironing shoe and the stationary roll. To prevent the driving of the roll a holdout member 99 is provided which has an end portion 100 adapted to be moved into a position between the forward end of the clutch lever 51 and the outer side of the supporting bracket 6 to prevent actuation of the clutch lever by the spring 55 when the roller 57 is moved out of engagement with the cam 56 of the lever. The hold-out member 99 is in substantially the form of a bell crank lever pivoted at 101 to the outer side of the supporting bracket 6 directly over the forward end of the clutch lever 51, one arm of the bell crank hanging down from the pivot 101 and having the lever engaging portion 100 at the lower end thereof and the other arm 102 of the bell crank extending forwardly from the pivot so that it can be pressed down by the operator to swing the retaining portion 100 into engagement with the lever 51.

It is desirable that the ironing shoe be instantly released from the roll upon release of the lever 93 so that the operator by simply pressing upon the plunger 97 may cause the release of the shoe. To accomplish this result an arm 103 is fixed to the rock shaft 9 and projects forwardly therefrom alongside the supporting bracket 6, and this arm has connected thereto at its forward end the lower end of a coil spring 104 which is connected at its upper end to the supporting bracket 6. The action of the spring 104 is to turn the rock shaft in a direction to release the ironing shoe held in roll engaging position by the toggle whenever the lever retaining latch 94 is released.

When the machine is not in use the ironing shoe is ordinarily disengaged from the roll as shown in Fig. 2 of the drawing. When it is desired to use the machine, the operator will connect the extension cord to the source of current and will then operate the switch 25 to permit the current to flow to the electrical heating element of the shoe and the switch 36[a] to start the motor 36. Then by pressing the knee against the rod 80 the half revolution clutch of the eccentric will be engaged, causing the pivot 88 of the toggle to be moved to its uppermost position straightening the toggle and moving the ironing shoe into engagement with the roll. The upward movement of the pivot 88 swings the arm 58 moving the roller 57 out of engagement with the cam 56, whereupon the spring 55 acts upon the clutch lever 51 to shift the gear 44 into clutch engagement with the sprocket 46 which is continuously driven by the motor 36. If at any time during the operation of the ironer it should be desirable to instantly free the ironing shoe from the roll, this may be done by pressing upon the plunger 97 to release the latch 94 and permit the spring 104 to swing the shoe away from the roll. In normal operation, however, the shoe may be more conveniently moved to inoperative position by simply pressing upwardly upon the rod 80 with the knee to rock the clutch shifter ring 70 downwardly to shift the key plate 63 into engagement with one of the notches 64 of the eccentric 61 causing the eccentric 61 to make a half revolution with the continuously driven shaft 41, the plate being disengaged at the end of the half revolution by engagement of one edge of one of the widened portions 83 of the key plate with the inclined portion 73 of the cam ring 70. When it is desired to use the ironing machine simply for pressing, the operator while the shoe is disengaged as shown in Fig. 2, places the article to be pressed on the roll 3 between the roll and shoe 4, presses down on the arm 102 of the hold-out member 99, swinging the end portion 100 in position between the forward end of the lever 51 and the supporting bracket to prevent actuation of the clutch lever when it is released by the operation of the shoe shifting mechanism. The shoe may then be pressed against the roll by pushing up on the rod 80 to engage the half revolution clutch of the eccentric to shift the eccentric and straighten the actuation toggle.

Having thus described the invention, what is claimed is:

1. In an ironing machine, an ironing roll, a rock shaft extending longitudinally of the roll, a shoe carried by said shaft and pivotally supported adjacent its opposite ends on said shaft, a pair of arms rigidly secured to said shaft and yieldably connected to said shoe, and means for actuating said rock shaft to move the shoe into and and out of engagement with the roll.

2. In an ironing machine, an ironing roll, a rock shaft extending longitudinally of the roll, a shoe adapted to engage said roll, a pair of shoe supporting arms pivotally mounted on said shaft and pivotally connected to the shoe, one adjacent each end thereof, a pair of arms fixed to the shaft, each being yieldably connected to one of said first mentioned arms, and means for actuating said rock-shaft.

3. In an ironing machine, an ironing roll, a rock shaft extending longitudinally of the roll, a shoe at the rear of the roll and adapted to engage said roll, a pair of shoe supporting arms pivotally mounted on said shaft and pivotally connected to the rear side of the shoe one adjacent each end thereof, a pair of actuating arms fixed to the shaft one adjacent and to the rear of each supporting arm, compression springs interposed between said actuating and supporting arms, and means for actuating said rock-shaft.

4. In an ironing machine, an ironing roll, a rock shaft extending longitudinally of the roll, a shoe adapted to engage said roll, a pair of shoe supporting arms pivotally mounted on said shaft and pivotally connected to the shoe one adjacent each end thereof, a pair of actuating arms fixed to the shaft one adjacent each supporting arm, compression springs interposed between said actuating and supporting arms, means for varying the tension of said springs, and means for actuating said rock-shaft.

5. In an ironing machine, an ironing roll, a rock shaft extending longitudinally of the roll, a shoe adapted to engage said roll, a pair of shoe supporting arms pivotally mounted on said shaft and pivotally connected to the shoe one adjacent each end thereof, said arms having spaced lugs, a pair of arms fixed to said shaft, each of said arms having a portion lying between the lugs of a supporting arm, compression springs interposed between the lugs of the supporting arm and the portions of the actuating arm lying between the same, and means for actuating the rock-shaft.

6. In an ironing machine, an ironing roll, a rock shaft extending longitudinally of the roll, a shoe adapted to engage said roll, a pair of shoe supporting arms pivotally mounted on said shaft and pivotally connected to the shoe one adjacent each end thereof, said arms having spaced lugs, a pair of arms fixed to said shaft, each of said arms having a portion lying between the lugs of a supporting arm, and compression springs interposed between the lugs of each supporting arm and the portions of the actuating arm lying between the same, adjustable means carried by one of the lugs for varying the tension of the springs, and means for actuating the rock-shaft.

7. An ironing machine comprising a supporting frame, a roll, a shoe cooperating with the roll, a rock shaft connected with the shoe for actuating the same, a toggle having one of its links releasably connected to the frame and the other connected to said rock shaft for actuating the same, means for driving the roll, and a manually engaged and automatically released mechanism for actuating said toggle from said driving means to shift the shoe into or out of shoe engaging position.

8. An ironing machine comprising a supporting frame, a roll, a shoe cooperating with the roll, a rock shaft connected with the shoe for actuating the same, a toggle having one of its links releasably connected to the frame and the other connected to said rock shaft for actuating the same, means for driving the roll including a shaft, an eccentric normally loose on said shaft and having a collar connected to the pivot of the toggle, and a half revolution clutch for connecting said eccentric at will to the shaft for actuating the toggle to engage the shoe with the roll or to disengage the same therefrom.

9. An ironing machine comprising a roll, a shoe cooperating with the roll, a rock shaft connected with the shoe for actuating the same, a toggle connected to said rock shaft for actuating the same, means for driving the roll, a manually engaged and automatically released mechanism for actuating said toggle from said driving means to shift the shoe into or out of roll engaging position, and manually operable means connected to one of the links of the toggle for actuating the shoe.

10. An ironing machine comprising a pair of ironing members, one of said members being a roll and the other a shoe cooperating with the roll, a rock shaft connected with one of said members for actuating the same, a toggle connected to said rock shaft for actuating the shaft, means for driving the roll, a manually engaged and automatically released mechanism for actuating said toggle from said driving means to shift one of said members into or out of engagement with the other, and a hand lever connected to one of the links of the toggle for actuating the rock-shaft.

11. An ironing machine comprising a roll, a shoe cooperating with the roll, a rock shaft connected with the shoe for actuating the shoe, a toggle connected to said rock shaft for actuating the shaft, means for driving the roll, a manually engaged and automatically released mechanism for actuating said toggle from said driving means to shift the shoe into or out of shoe engaging position, and means operated by the toggle in its movements for controlling the operation of the roll.

12. An ironing machine comprising a roll, a shoe cooperating with the roll, a rock shaft connected with the shoe for actuating the same, said rock shaft having an arm fixed thereto, a hand lever, means for releasably locking said lever in a given position, a toggle having one of its links connected to said arm and its other link connected to the lever, means for driving the roll, and means operated by said driving means for shifting the pivot of the toggle for shifting said shoe.

13. In an ironing machine, an ironing roll, a shoe mounted for movement toward and from the roll, means for shifting the shoe into and out of engagement with the roll, a driving member adapted to be continuously driven, means for connecting said shoe shifting means to said driving member to shift said shoe into or out of engagement with the roll, mechanism controlled by the shoe shifting means for automatically connecting said roll to said driving member as the shoe is moved into engagement therewith, and means movable independently of said shoe shifting means for rendering said mechanism inoperative.

14. In an ironing machine, a pair of ironing members, one mounted for movement toward and from the other, one of said members being a roll and the other a shoe, means for shifting one of said members into and out of engagement with the other, a driving member adapted to be continuously driven, means including a clutch for connecting said shifting means with said driving member, means including a clutch for driving the roll from said driving member, means operated by said shifting means for engaging and disengaging said second mentioned clutch, and means for preventing operation of said second mentioned clutch by said shifting means.

15. In an ironing machine, an ironing roll, a shoe mounted for movement toward and from said roll, a drive shaft, means for driving said shaft, an eccentric loosely mounted on said shaft, a clutch for connecting said eccentric to the shaft, manually controlled means for operating said clutch to connect the eccentric to the shaft, means operating automatically to disengage the clutch after said eccentric has made half of a revolution with the shaft, means connecting said eccentric and shoe for shifting the shoe to the roll during one actuation of the eccentric and away from the roll during the succeeding actuation of the eccentric, and means operated by the shoe shifting means for establishing a driving connection between said shaft and roll during movement of the shoe toward the roll.

16. In an ironing machine, an ironing roll, an ironing shoe mounted for movement toward and from the roll, a rock shaft connected to the shoe for shifting the same, a toggle having one link thereof connected to the rock shaft for actuating the same, a movably mounted member to which the opposite end of the toggle is connected, means for holding said movably mounted member against movement, means for shifting the pivot of the toggle for actuating the rock shaft, and means for releasing said holding means to permit movement of the shoe away from the roll.

17. In an ironing machine, an ironing roll, means for driving the same, an ironing shoe mounted for movement toward and from the roll, a spring connected with said shoe and tending to move said shoe away from the roll, actuating members connected with the shoe for shifting the same toward or from the roll, means for operating said actuating members from said driving means to shift the shoe into or out of engagement with the roll, and means for releasing said actuating members to permit shifting of the shoe by said spring.

18. In an ironing machine, an ironing roll, a shoe mounted for movement toward and from the roll, means for shifting the shoe into and out of engagement with the roll comprising a continuously rotated driving member, a cooperating rotatable driven member having a disconnectible driving connection with said driving member and operator-operated means for effecting the driving connection between said members, first for a part and then for the remainder of one revolution of said driven member to shift said shoe into and out of engagement with the roll, means operated by the shoe shifting means for automatically connecting said roll to said driving member as the shoe is moved into engagement therewith, and means for rendering said last mentioned means inoperative.

19. In an ironing machine, an ironing roll, a shoe mounted for movement toward and from the roll, means for shifting the shoe into and out of engagement with the roll comprising a continuously rotated driving member, a cooperating rotatable driven member having a disconnectible driving connection with said driving member and operator-operated means for effecting the driving connection between said members, first for a part of one revolution and then for the remainder of one revolution of said driving member to shift said shoe into and out of engagement with the roll, means operated by the shoe shifting means for automatically connecting said roll to said driving member as the shoe is moved into engagement therewith, and means for rendering said last mentioned means inoperative.

20. In an ironing machine, a pair of ironing members, one mounted for movement toward and from the other, one of said members being a roll and the other a shoe, means for shifting said shoe into and out of engagement with said roll, a driving member adapted to be continuously driven, means including a clutch for connecting said shifting means with said driving member, means including a clutch for driving the roll from said driving member, means operated by said shifting means for engaging and disengaging said second mentioned clutch, and means for preventing operation of said second mentioned clutch by said shifting means.

21. In an ironing machine, a pair of ironing members, one mounted for movement toward and from the other, one of said members being a roll and the other a shoe, means for shifting one of said members into and out of engagement with the other, a driving member adapted to be continuously driven, means including a clutch for connecting said shifting means with said driving member, manually operated means for releasing said members from engagement with each other independently of the operation of said shifting means, means including a clutch for driving the roll from said driving member, means operated by said shifting means for engaging and disengaging said second mentioned clutch, and means for preventing operation of said second mentioned clutch by said shifting means.

22. In an ironing machine, an ironing roll, a shoe mounted for movement toward and from said roll, a drive shaft, means for driving said shaft, an eccentric loosely mounted on said shaft, a clutch for connecting said eccentric to the shaft, manually controlled means for operating said clutch to connect the eccentric to the shaft, means operating automatically to disengage the clutch after said eccentric has made half of a revolution with the shaft, means connecting said eccentric and shoe for shifting the shoe to the roll during one actuation of the eccentric and away from the roll during the succeeding actuation of the eccentric, means operated by the shoe shifting means for establishing a driving connection between said shaft and roll during movement of the shoe toward the roll, and means for preventing operation of said last named means by said shoe shifting means.

23. In an ironing machine, an ironing roll, a shoe mounted for movement toward and from said roll, a drive shaft, means for driving said shaft, an eccentric loosely mounted on said shaft, a clutch for connecting said eccentric to the shaft, manually controlled means for operating said clutch to connect the eccentric to the shaft, means operating automatically to disengage the clutch after said eccentric has made half of a revolution with the shaft, means connecting said eccentric and shoe for shifting the shoe to the roll during one actuation of the eccentric and away from the roll during the succeeding actuation of the eccentric, manually operated means for releasing said shoe from engagement with said roll independently of the operation of said shoe shifting means, and means operated by the shoe shifting means for establishing a driving connection between said shaft and roll during movement of the shoe toward the roll.

24. In an ironing machine, an ironing roll, a shoe mounted for movement toward and from the roll, means for shifting the shoe into and out of engagement with the roll, a driving member adapted to be continuously driven, means for connecting said shoe shifting means to said driving member to shift said shoe into or out of engagement with the roll, mechanism controlled by the shoe shifting means for automatically connecting said roll to said driving member as the shoe is moved into engagement therewith, and hand operated means movable independently of said shoe shifting means for rendering and maintaining said mechanism inoperative.

THE APEX ELECTRICAL
MANUFACTURING COMPANY,
*Assignee of John Prachar, Deceased,*
By CLARENCE G. FRANTZ,
*President.*

DISCLAIMER

Re. 19,217.—*John Prachar*, deceased, late of Cleveland, Ohio, by *The Apex Electrical Manufacturing Company*, assignee. IRONING MACHINE. Patent dated June 19, 1934. Disclaimer filed February 8, 1939, by the assignee, *The Apex Electrical Manufacturing Company*.

Hereby disclaims claim 24 from the specification of the said patent.

[*Official Gazette March 7, 1939.*]